Figure 1:
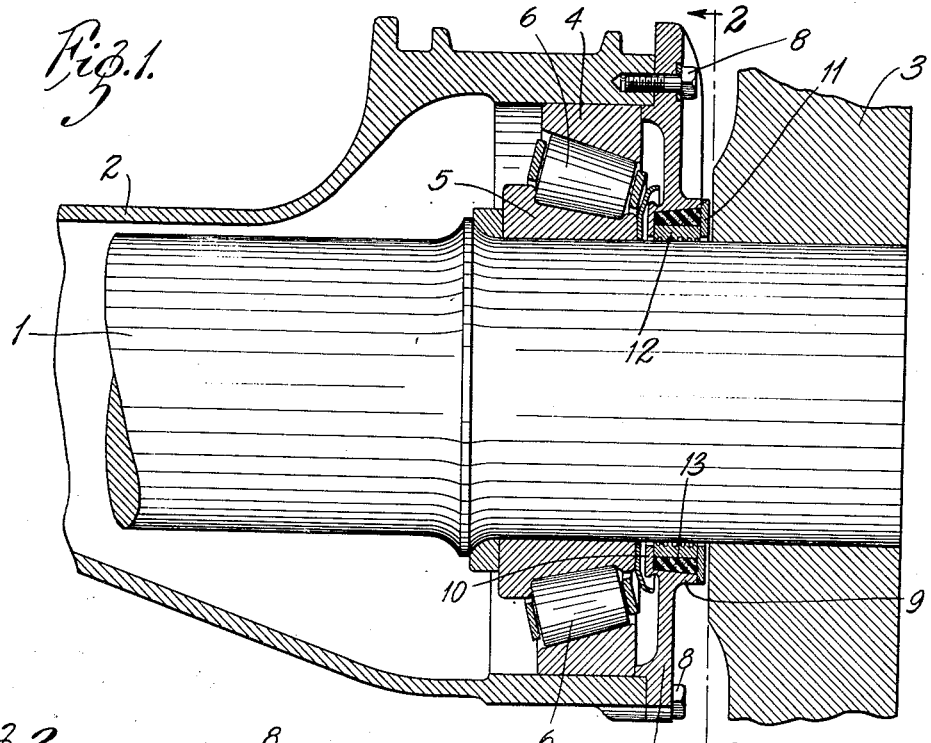

Oct. 17, 1939.   C. A. BROTHERTON   2,176,291
END CLOSURE FOR AXLE HOUSINGS
Filed March 25, 1938

INVENTOR:
C. A. Brotherton
by Arnold Cann
& Gravely
HIS ATTORNEYS.

Patented Oct. 17, 1939

2,176,291

UNITED STATES PATENT OFFICE 2,176,291

END CLOSURE FOR AXLE HOUSINGS

Clifford A. Brotherton, Columbus, Ohio, assignor to The Timken Roller Bearing Company, Canton, Ohio, a corporation of Ohio Application March 25, 1938, Serial No. 198,014

5 Claims. (Cl. 308—187.1)

My invention relates to that type of axle construction wherein there are a housing, an axle extending through said housing, bearings interposed between said housing and said axle, a closure plate for each end of the housing and means, such as a sealing ring, for making a tight joint between the closure plate and the axle. It has been found in practice that, under certain conditions, such as loose adjustment of the bearings, a considerable portion of the housing load will be transmitted to the axle through the sealing ring with the result that the axle is liable to be scored and the closure plate bolts are likely to be sheared and the closure plate is liable to be broken. The principal object of the present invention is to prevent such accidents. The invention consists principally in providing clearance between the axle and the closure plate and interposing a resilient ring between the metal sealing ring and the closure plate of the housing so that transverse shifting of the axle to a limited extent from its true position will be permitted without destroying the tightness of the joint and without transmitting the housing load through the closure plate to the axle. It also consists in the parts and in the combinations of parts hereinafter described and claimed.

Figures 2, 3:
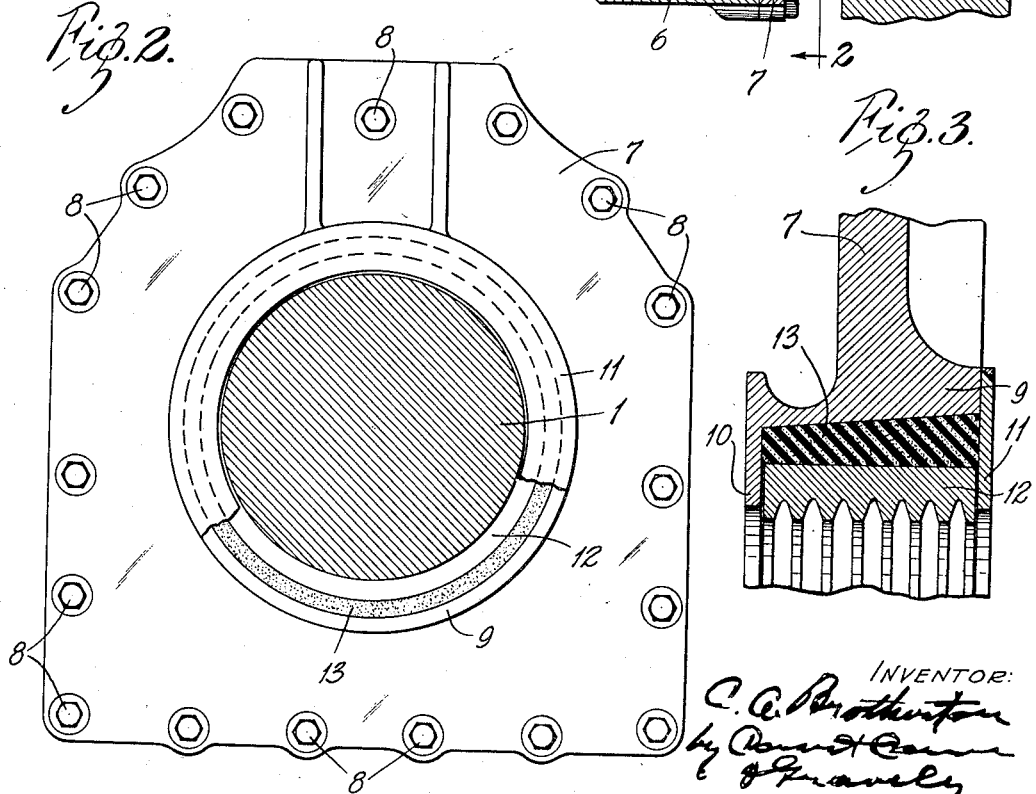

In the accompanying drawing, wherein like reference numerals refer to like parts wherever they occur:

Fig. 1 is a longitudinal sectional view of a portion of a known type of locomotive driving axle construction with my invention embodied therein, Fig. 2 is mainly a cross-section on the line 2—2 of Fig. 1 with a portion of the welded retaining ring broken away and showing the closure plate in elevation, Fig. 3 is an enlarged detail view of a portion of the sealing ring and adjacent portions of the closure plate.

In the construction illustrated, the axle 1 extends through a hollow housing 2 which has a driving wheel 3 securely mounted on its projecting end. The end of the housing is enlarged to receive the cup or outer raceway member 4 of a tapered roller bearing whose cone or inner bearing member 5 is mounted on the axle with tapered rollers 6 interposed between said inner and outer raceway members. An end closure plate 7 is secured by cap screws 8 to the end of the housing.

This closure plate has a hub 9 with a bore or opening through which the axle extends. At the inner end of the bore, the hub has an inwardly extending annular flange 10 whose inside diameter is enough larger than the axle to keep said flange from "riding" or touching the axle under all contemplated conditions of bearing adjustment. The inner end face of the hub portion of the closure plate adjacent to the axle clears the end of the cone or inner raceway member. The main portion of the bore in the closure plate is enough larger than the axle to receive an annular sealing member which is held against movement lengthwise by a metal retaining ring or washer 11 which is preferably welded to the closure plate with its inner margin overlapping the end of the sealing member but with substantial clearance between the inner edge of said washer and the axle.

The annular sealing member comprises a relatively incompressible portion and a relatively compressible or elastic portion. The first is a wide ring 12 of bronze or other soft bearing metal with annular grooves in its inner surface, said bronze ring being adapted to make a running fit with the axle. Surrounding this bronze ring is the second portion of the sealing member which is a sleeve or lining 13 of elastic material, such as rubber or synthetic rubber, which is preferably vulcanized to the bronze ring and makes a frictional fit in the bore of the closure plate. The inner margin of the retaining ring 11 extends inwardly beyond the outer periphery of the bronze ring but preferably the ends of the bronze ring are spaced slightly from said retaining ring and from the shoulder at the inner end of the bore of the closure plate.

Under normal conditions, the construction hereinbefore described operates after the manner of the old construction; that is, the load on the housing is transmitted to the axle entirely through the bearing. In the old construction, the loosening of the bearing permitted the housing to drop until the closure plate rested on the axle, in which condition the load on the housing was transmitted partially or wholly through the closure plate to the axle. In the present construction, the loosening of the roller bearing permits the housing to drop but, on account of the clearance provided between the axle and the closure plate and the elasticity of the sleeve of the sealing member, which is interposed between the closure plate and the axle, the roller bearing will continue to carry practically the whole load until such clearance is taken up. Thus, the axle is saved from scoring, the cap screws are saved from shearing and the closure plate is saved from breaking and the sealing member maintains an oil tight joint between the axle and the closure plate.

In practice, it is desirable to make the main portion of the bore of the closure plate with a slight inward taper to facilitate mounting of the sealing member therein. Likewise, it is desirable to vulcanize the elastic member of the sealing member to the bronze ring thereof and to make the elastic member of the proper size and taper to fit the bore of the closure plate. This permanent securing of the two parts of the sealing member together has the great advantage that the two parts may be properly adjusted and secured together in a separate unitary article which may be kept in stock and is quite easy to assemble with the closure plate.

What I claim is:

1. The combination of a housing having an opening therein, a shaft extending through said opening, a roller bearing between said shaft and said housing, which bearing normally transmits load from the housing to the axle, a closure plate removably secured to said housing and having an opening therethrough for said shaft, a closure member comprising an inner ring of metal surrounding said shaft, and a resilient annular member interposed between said plate and said ring and permitting relative movement of said ring and said plate, whereby the shaft and the housing are saved from injury in case the bearing becomes loose.

2. The combination of a housing, an axle extending therethrough, a roller bearing between said axle and said housing, which bearing normally transmits load from the housing to the axle, a closure plate secured to the end of the housing clear of said axle, and a closure member fitting between the axle and the closure plate, said closure member comprising a soft metal ring and a sleeve of elastic material thereon whereby the axle may be displaced to a limited extent transversely from its correct position without shifting the housing load from the bearing to the closure plate.

3. The combination of a housing, an axle extending therethrough, a tapered roller bearing between said axle and said housing, which bearing normally transmits load from the housing to the axle, a closure plate secured to the end of the axle, a closure plate secured to the end of the housing with clearance between it and said axle, and a sealing member fitting between the axle and the closure plate, said sealing member comprising a bronze ring and a rubber member vulcanized thereon whereby the axle may be displaced to a limited extent transversely from its correct position without shifting the housing load from the bearing to the closure plate.

4. The combination of a housing, an axle extending therethrough, a tapered roller bearing between said axle and said housing, which bearing normally transmits load from the housing to the axle, a closure plate secured to the end of the housing and clear of said axle, and a closure member fitting between the axle and the closure plate, said closure member comprising a transversely movable soft metal ring having annular grooves in its inner surface and a sleeve of elastic material surrounding said ring and extending beyond both ends of said ring whereby the axle may be displaced transversely from its correct position without shifting the housing load from the bearing to the closure plate.

5. The combination of a housing having an end closure, an axle extending through said end closure, and a bearing between said housing and said axle and serving to transmit the load of the housing to the axle, said end closure comprising a main member with an opening therethrough, a hub member positioned in said opening clear of the main member and freely fitting the axle, and an elastic ring between said hub member and said main member.

CLIFFORD A. BROTHERTON.